United States Patent
Wang et al.

(10) Patent No.: US 12,475,037 B2
(45) Date of Patent: Nov. 18, 2025

(54) VOLTAGE-TRIGGERED PERFORMANCE THROTTLING

(71) Applicant: Micron Technology, Inc., Boise, ID (US)

(72) Inventors: Hui Wang, Shanghai (CN); Minjian Wu, Zhejiang (CN); Hongyan Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/441,996

(22) Filed: Feb. 14, 2024

(65) Prior Publication Data
US 2024/0296117 A1 Sep. 5, 2024

Related U.S. Application Data

(60) Provisional application No. 63/487,675, filed on Mar. 1, 2023.

(51) Int. Cl.
*G06F 12/02* (2006.01)
(52) U.S. Cl.
CPC ................ *G06F 12/0246* (2013.01)
(58) Field of Classification Search
None
See application file for complete search history.

(56) References Cited

U.S. PATENT DOCUMENTS

| | | | |
|---|---|---|---|
| 6,199,127 B1* | 3/2001 | Ajanovic | G06F 13/18 711/100 |
| 2007/0288769 A1* | 12/2007 | Chang | G06F 1/206 713/300 |
| 2008/0162951 A1* | 7/2008 | Kenkare | G06F 1/3225 713/300 |
| 2014/0097813 A1* | 4/2014 | Dally | H02M 3/158 323/272 |
| 2014/0232368 A1* | 8/2014 | Dally | H02M 3/1584 323/311 |
| 2015/0185797 A1* | 7/2015 | Cooper | G06F 1/3275 713/340 |
| 2015/0261473 A1* | 9/2015 | Matsuyama | G06F 3/0659 711/103 |
| 2016/0291625 A1* | 10/2016 | Tripathi | G06F 1/3296 |
| 2016/0306412 A1* | 10/2016 | Kolla | G06F 1/3287 |

(Continued)

FOREIGN PATENT DOCUMENTS

WO WO-2010093750 A2 * 8/2010 ............... G06F 1/28

*Primary Examiner* — Kevin Verbrugge
(74) *Attorney, Agent, or Firm* — Nicholson De Vos Webster & Elliott LLP

(57) ABSTRACT

Exemplary methods, apparatuses, and systems include a performance throttling manager for controlling performance levels of a memory subsystem using input voltages. The performance throttling manager monitors input voltages to a memory device to determine a current input voltage value, while the memory device is operating at a first performance level. The performance throttling manager detects that the current input voltage value satisfies a threshold voltage value. The performance throttling manager selects a second performance level that is lower than the first performance level and throttles the performance of the memory device in response to detecting that the current input voltage value satisfies a threshold voltage value.

18 Claims, 4 Drawing Sheets

(56) References Cited

U.S. PATENT DOCUMENTS

| | | | | |
|---|---|---|---|---|
| 2016/0357243 A1* | 12/2016 | Dorsey | ............... | G06F 1/324 |
| 2017/0212572 A1* | 7/2017 | Ragland | ............ | G06F 1/3296 |
| 2022/0197520 A1* | 6/2022 | Kobayashi | .......... | H02M 1/007 |

* cited by examiner

VOLTAGE-TRIGGERED PERFORMANCE THROTTLING

CROSS-REFERENCE TO RELATED APPLICATION

The present application claims the benefit of U.S. Provisional Patent Application No. 63/487,675 filed on Mar. 1, 2023, which is incorporated by reference herein in its entirety.

TECHNICAL FIELD

The present disclosure generally relates to managing performance of memory subsystems, and more specifically, relates to voltage-triggered performance throttling of the memory subsystems.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
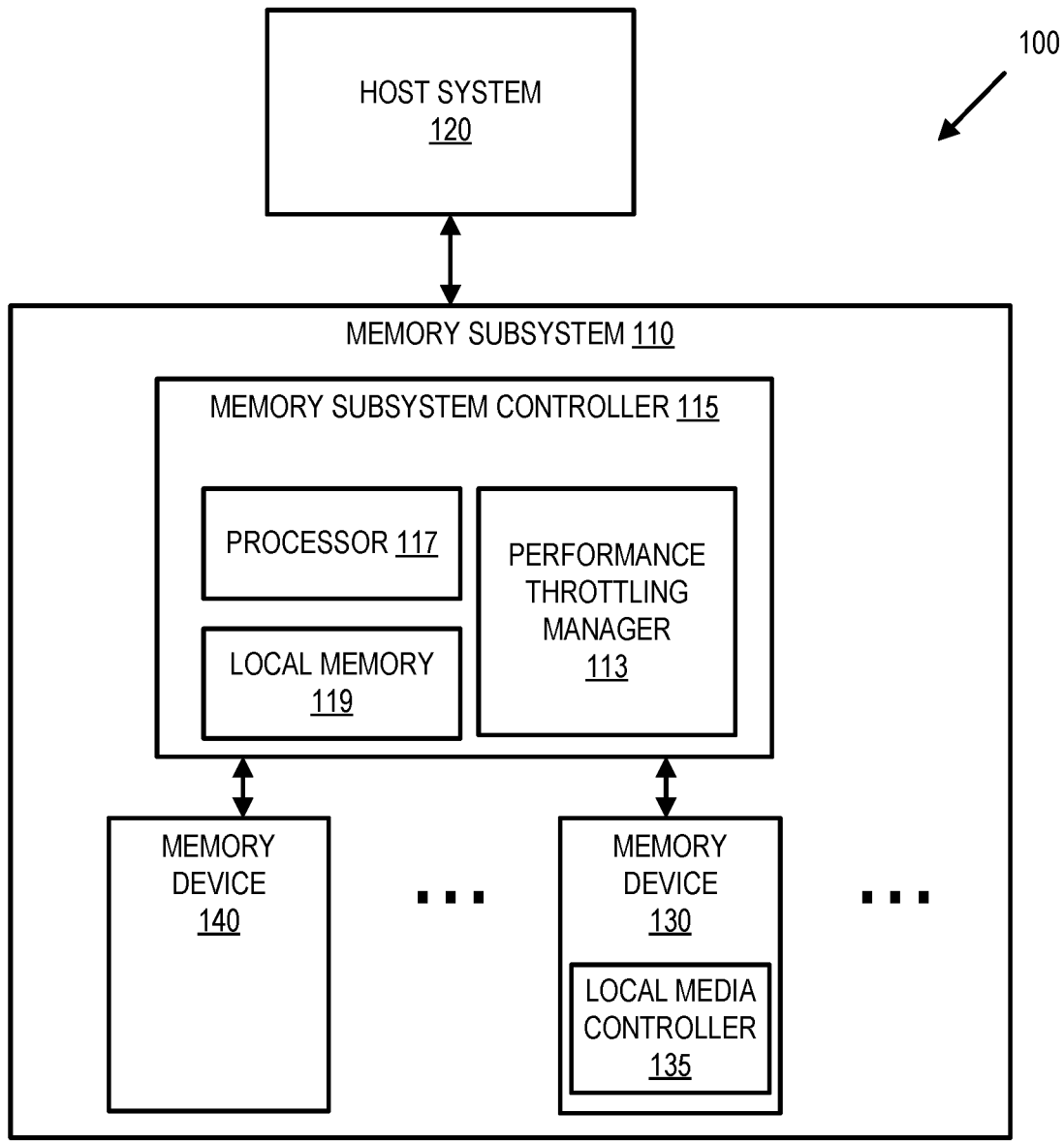
FIG. 1 illustrates an example computing system that includes a memory subsystem in accordance with some embodiments of the present disclosure.

Aspects of the present disclosure are directed to managing performance levels of a memory subsystem using a measurement of input voltage. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and octo-level cells (OLC). For example, an SLC can store one bit of information and has two logic states.

Operating environments for automotive technology systems have become increasingly sophisticated with respect to the user experience such as infotainment, driver assistance, and other systems. Automotive technology systems are exposed to a range of temperatures that impact performance. For example, a high-temperature environment can result in high current levels in an automotive memory subsystem. High current levels can cause a power supply voltage drop and memory failures. In typical systems, throttling is performed based on measuring the temperature of the memory device. For example, different performance levels of the memory device are selected using an internal temperature. However, memory device failures can occur at nominal operating temperatures due to mismatches between the power system and the memory device capabilities. As a result, conventional thermal throttling fails to prevent memory device operation failures that occur during normal temperature conditions.

Aspects of the present disclosure address the above and other deficiencies by monitoring input voltage levels of the memory subsystem. The memory subsystem selects a performance level of the memory subsystem based on the input voltage and, as a result, protects the memory device from excessive current that can occur at normal or elevated temperature levels. For example, performance throttling manager monitors the input voltage (e.g., uses the input voltage value to select, look up, or otherwise determine the performance level) at the memory subsystem controller and selects different performance levels of the memory device when the voltage falls below a threshold, indicating an excessive current is detected. The selected performance level reduces current consumption within the memory subsystem. As the input voltage stabilizes, the performance throttling manager can increase the performance of the memory device until the highest performance setting is achieved with stable input voltage.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a performance throttling manager 113 that monitors input voltages to the memory subsystem 110 and based on the input voltages value, selects a performance level of the memory subsystem. In some embodiments, the controller 115 includes at least a portion of the performance throttling manager 113. For example, the controller 115 can include a processor 117 (processing device) configured to execute instructions stored in local memory 119 for performing the operations described herein. In some embodiments, the performance throttling manager 113 is part of the host system 120, an application, or an operating system.

The performance throttling manager 113 can monitor input voltages to the memory subsystems 110. In an example, the performance throttling manager 113 includes a voltage drop detector that can detect whether an input voltage to the memory subsystem 110 has satisfied a threshold voltage level (e.g., the input voltage is less than the threshold voltage level). The performance throttling manager 113 throttles performance by controlling the frequency of the controller, a number of parallel commands that can be executed, and/or other performance attributes of the memory subsystem 110. In some embodiments, the performance throttling manager 113 defines a number of performance levels with varying amounts of performance throttling of the memory subsystem. The number of performance levels is configurable and can be related to the capabilities, design, quality of service requirements, settings, etc. of one or more of the memory subsystem 110, the host system 120, and the memory devices 130 and 140, or the combination thereof. In one example, the number of performance levels has a maximum performance (e.g., performance profile 1) that is the default performance level, two intermediate performance levels, and a baseline performance level. The baseline performance level represents a performance at the lowest useful operation of the memory subsystem 110 and is designed to work under the lowest power consumption. For example, the memory subsystem 110 lacks direct control over the input voltage from the host system 120. Viewing the input voltage, however, in terms of a power specification (e.g., in simplest terms, power=input voltage*current), varied current consumption by the memory subsystem 110 can result in input voltage jitter. Working under the lowest power consumption in the baseline performance level reduces current consumption, which accommodates a lowest acceptable input voltage. The intermediate performance levels represent performance levels that are higher than the baseline performance level but lower than the maximum performance. In the intermediate performance levels, varying degrees of voltage reductions (e.g., effectively a lower voltage input) are accommodated with corresponding adjustments in the performance of the memory subsystem.

In some embodiments, at initialization, the performance throttling manager 113 selects a maximum performance level. While operating at the maximum performance level, the performance throttling manager 113 monitors the input voltage. Once input voltage satisfies the threshold voltage value and the performance throttling manager 113 will select a performance level that is lower than the maximum performance level. In response to a trigger event (e.g., a time delay, a number of operations, etc.), the performance throttling manager 113 compares an additional value of the input voltage to determine if the additional value of the input voltage satisfies the threshold voltage value. If the additional value of the input voltage still satisfies the threshold voltage value, the performance throttling manager 113 extends the operation of the memory subsystem at the selected performance level. If the additional value of the input voltage does not satisfy the threshold voltage value, the performance throttling manager 113 selects a different performance level that is higher than the selected performance level. In one embodiment, the performance throttling manager 113 selects an intermediate performance level that is higher than the current performance level but is lower than the maximum performance level. The performance throttling manager 113 can periodically adjust the performance level based on the value of the input voltage until the performance level returns to the maximum performance level.

Figure 2:
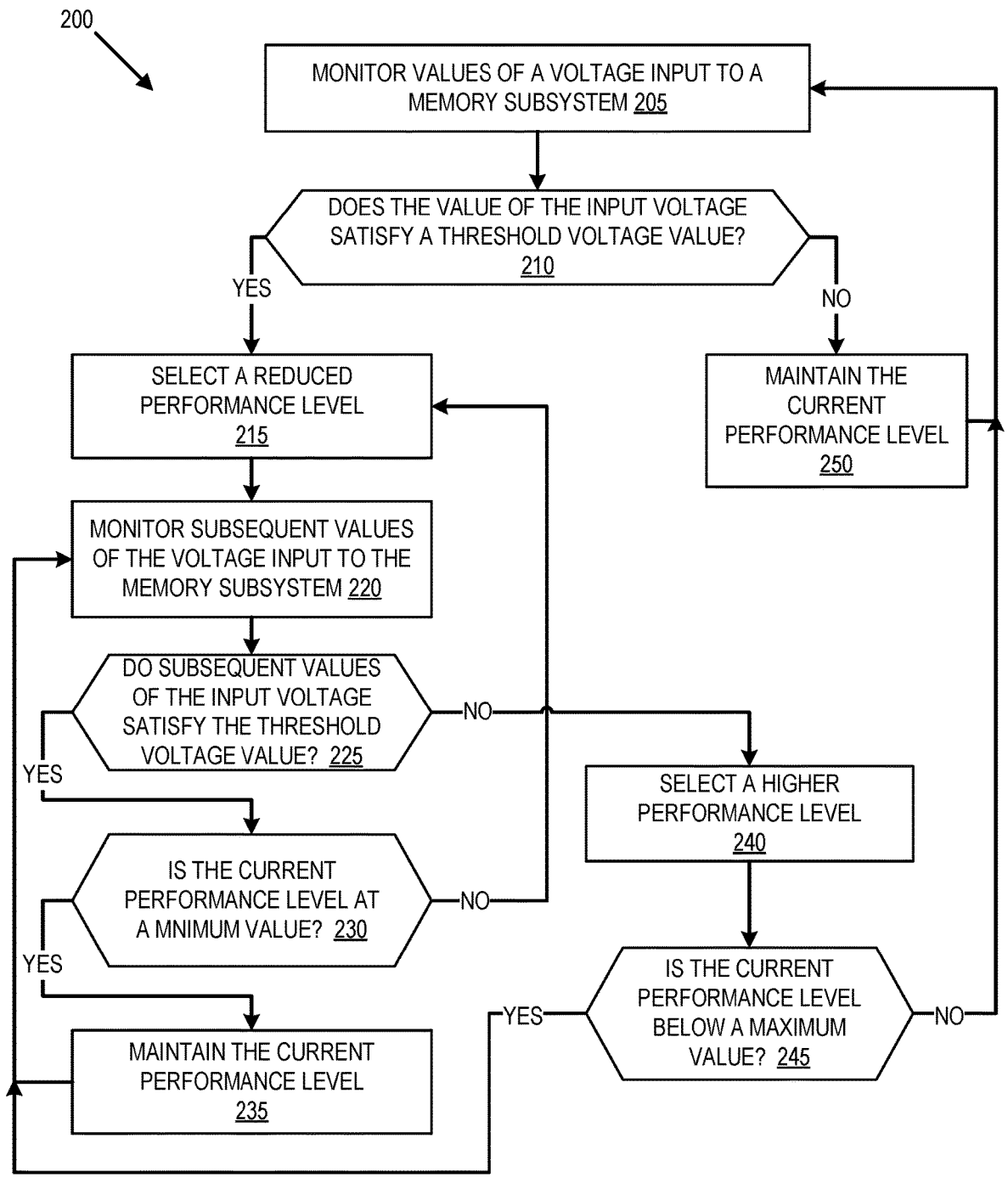
FIG. 2 is a flow diagram of an example method of managing the performance of a memory subsystem using multiple voltage trigger levels in accordance with some embodiments of the present disclosure.

FIG. 2 is a flow diagram of an example method of managing the performance of a memory subsystem using multiple voltage trigger levels in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the performance throttling manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the performance throttling manager 113 monitors values of an input voltage to a memory subsystem. In some embodiments, the performance throttling manager 113 monitors a set of input voltages that includes one or both of a voltage at the common collector ($V_{cc}$) and a voltage of the power supply for input and/or output signals ($V_{ccq}$). The performance throttling manager 113 can monitor the set of voltages directly or receive a measurement from a voltage drop detector. In some embodiments, the performance throttling manager 113 performs the method 200 with respect to each input voltage in parallel.

At operation 210, the performance throttling manager 113 determines if the value of the input voltage satisfies a threshold voltage value. In some embodiments, the threshold voltage value is a pre-determined value that represents a voltage below which a failure of the memory subsystem may occur. Each of the input voltages $V_{cc}$ and $V_{ccq}$ may have different threshold voltage values. The performance throttling manager 113 compares a measured value of the input voltage with a corresponding threshold value. If the measured value of the input voltage satisfies (e.g., is less than) the threshold voltage value, then the method 200 proceeds to operation 215. If the measured value of the input voltage does not satisfy (e.g., is greater than) the threshold voltage value, then the method 200 proceeds to operation 250.

At operation 215, the performance throttling manager 113 selects a reduced performance level. As described above, the performance throttling manager 113 may define a number of performance levels with increasing levels of throttling that reduces the performance level of the memory subsystem 110. In response to detecting that the value of the input voltage satisfies the threshold voltage value at operation 210, the performance throttling manager 113 selects a reduced performance level. In an example with the memory subsystem 110 operating at the maximum performance level, the performance throttling manager 113 selects the baseline performance level (e.g., the lowest available performance level in the number of performance levels). The performance throttling manager 113 maintains the baseline performance level until the value of the input voltages increase, as described below. In some embodiments, the performance throttling manager 113 selects any performance level which is lower than the current performance level. For example, the performance throttling manager 113 can select an intermediate performance level that is lower than the current performance level but higher than the baseline performance level.

In some embodiments, in response to determining at operation 210 that a value of the $-V_{cc}$ satisfies the threshold voltage value, the performance throttling manager selects a reduced performance level that includes a reduction in a number of parallel commands that are available for execution on the NAND. In other embodiments, in response to determining at operation 210 that a value of $V_{ccq}$ satisfies the threshold voltage value, the performance throttling manager 113 selects a reduced performance level that includes an adjustment to a frequency of a controller.

At operation 220, the performance throttling manager 113 monitors subsequent values of the input voltages to the memory subsystem. The memory subsystem 110 is operating at the reduced performance level and the performance throttling manager 113 is continuing the monitoring of values of the input voltages. The monitoring of input voltages at operation 220 is substantially similar to the monitoring described with reference to operation 205.

At operation 225, the performance throttling manager 113 determines if subsequent values of the input voltage satisfy the threshold voltage value. For example, while operating at the reduced performance level, the input voltages may increase towards a nominal operating level. The performance throttling manager 113 compares the subsequent values of the input voltage with the threshold voltage value to determine whether the subsequent values of the input voltage are less than the threshold voltage value. If the measured value of the subsequent value satisfies (e.g., is less than) the threshold voltage value, then the method 200 proceeds to operation 230. If the measured value of the subsequent voltage does not satisfy (e.g., is greater than) the threshold voltage value, then the method 200 proceeds to operation 240.

At operation 230, the performance throttling manager 113 determines if the current performance level is at a minimum performance level. If the performance throttling manager 113 determines that the current performance level is at the minimum level, the method 200 proceeds to operation 235. If the performance throttling manager 113 determines that the current performance level is not at the minimum level, the method 200 returns to operation 215.

At operation 235, the performance throttling manager 113 maintains the current performance level of the memory subsystem 110 at the reduced performance level which is the minimum performance level. For example, if the memory subsystem 110 is operating at the minimum performance level, the performance throttling manager 113 makes no adjustments to the performance settings. The method 200 returns to operation 220 from operation 235 and proceeds as described above.

At operation 240, the performance throttling manager 113 selects a higher performance level. For example, if the memory subsystem 110 is operating at the reduced performance level and the subsequent values of the input voltage do not satisfy the threshold voltage value at operation 225, the performance throttling manager 113 increases the performance level. The performance throttling manager 113 may select one of the intermediate performance levels, or the maximum performance level. For example, if the memory subsystem 110 is operating at one of the intermediate performance levels and the subsequent values of the input voltage do not satisfy the threshold voltage value at operation 225, the performance throttling manager 113 increases the performance level to a different intermediate performance level that has higher performance than the current performance level, or the maximum performance level. In another example, if the memory subsystem 110 is operating at the minimum performance level and the subsequent values of the input voltage do not satisfy the threshold voltage value at operation 225, the performance throttling manager 113 increases the performance level to one of the intermediate performance levels. In some embodiments, the performance throttling manager 113 selects the next higher performance level from the current performance level (i.e., incrementing performance one level at a time).

At operation 245, the performance throttling manager 113 determines if the current performance level is below a maximum performance level. If the performance throttling manager 113 determines that the current performance level is below the maximum level, the method 200 returns to operation 220 and continues to monitor subsequent values of the input voltage to adjust performance levels as described above. If the performance throttling manager 113 determines that the current performance level is at the maximum level, the method 200 returns to operation 205.

Returning to operation 210, when the measured value of the input voltage does not satisfy (e.g., is greater than) the threshold voltage value, the method 200 proceeds to operation 250. At operation 250, the performance throttling manager 113 maintains the existing performance level. In an example, if the memory subsystem 110 is operating at a default performance level after initialization (e.g., the maximum performance level or another default performance level available), the performance throttling manager 113 extends the operations of the memory subsystem at the existing performance level.

Figure 3:
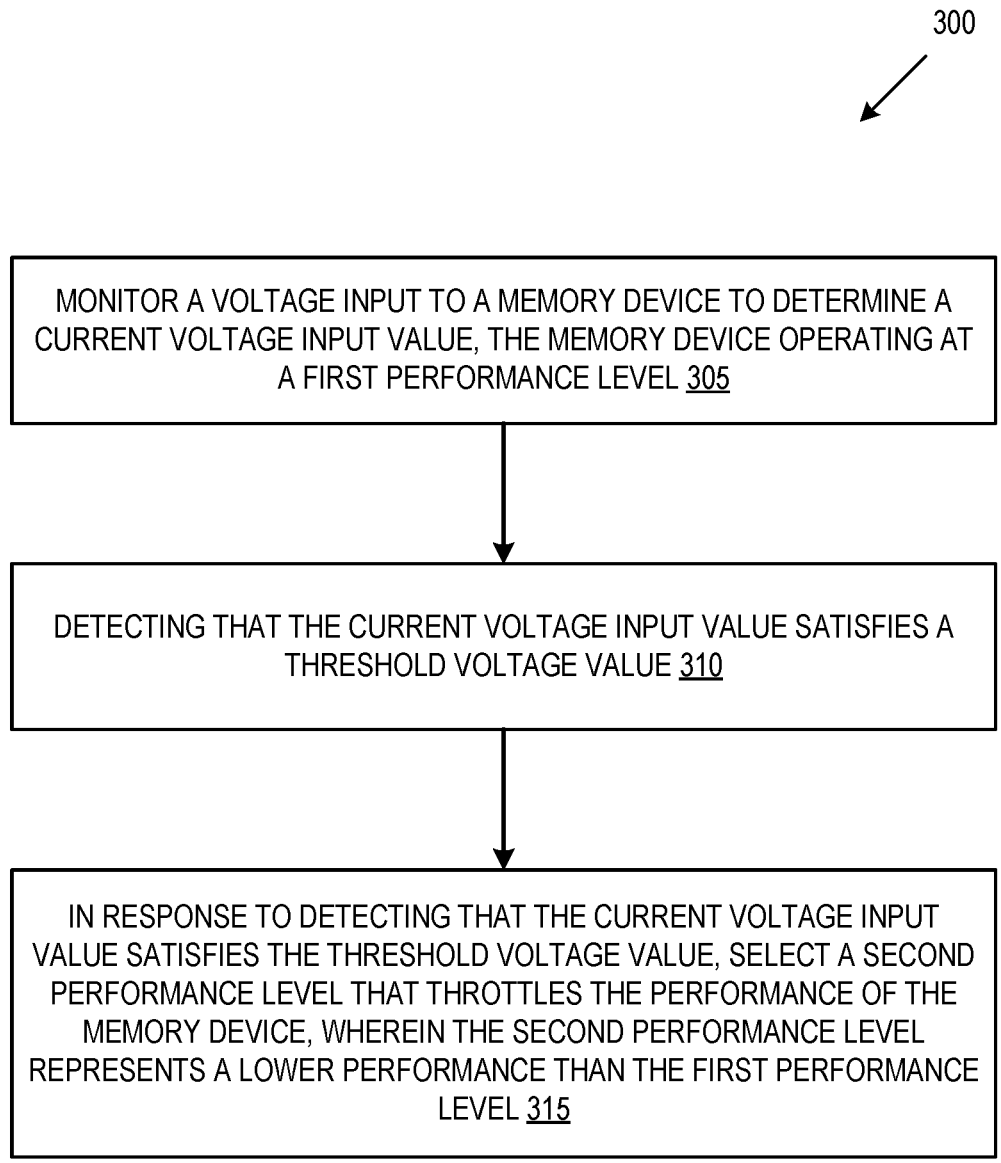
FIG. 3 is a flow diagram of an example method of voltage-triggered performance throttling in accordance with some embodiments of the present disclosure.

FIG. 3 is a flow diagram of an example method of voltage-triggered performance throttling in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the performance throttling manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the performance throttling manager 113 monitors an input voltage to a memory device to determine a current input voltage value, while the memory device operating at a first performance level. As described above, e.g., with reference to operation 205, the performance throttling manager 113 measures directly or otherwise receives values of the input voltage to the memory device.

At operation 310, performance throttling manager 113 detects if the current input voltage value satisfies a threshold voltage value. As described above, e.g., with reference to operation 210, the performance throttling manager 113 compares the input voltage to the memory device with the threshold voltage value to determine if, e.g., the current value of the input voltage is greater than or less than the threshold voltage value.

At operation 315, the performance throttling manager 113 selects a second performance level that throttles the performance of the memory device with the second performance level representing a lower performance than the first performance level in response to detecting that the current input voltage value satisfied threshold value at operation 310. As described above, e.g., with reference to operation 215, the performance throttling manager 113 reduces the performance level of the memory device.

Figure 4:
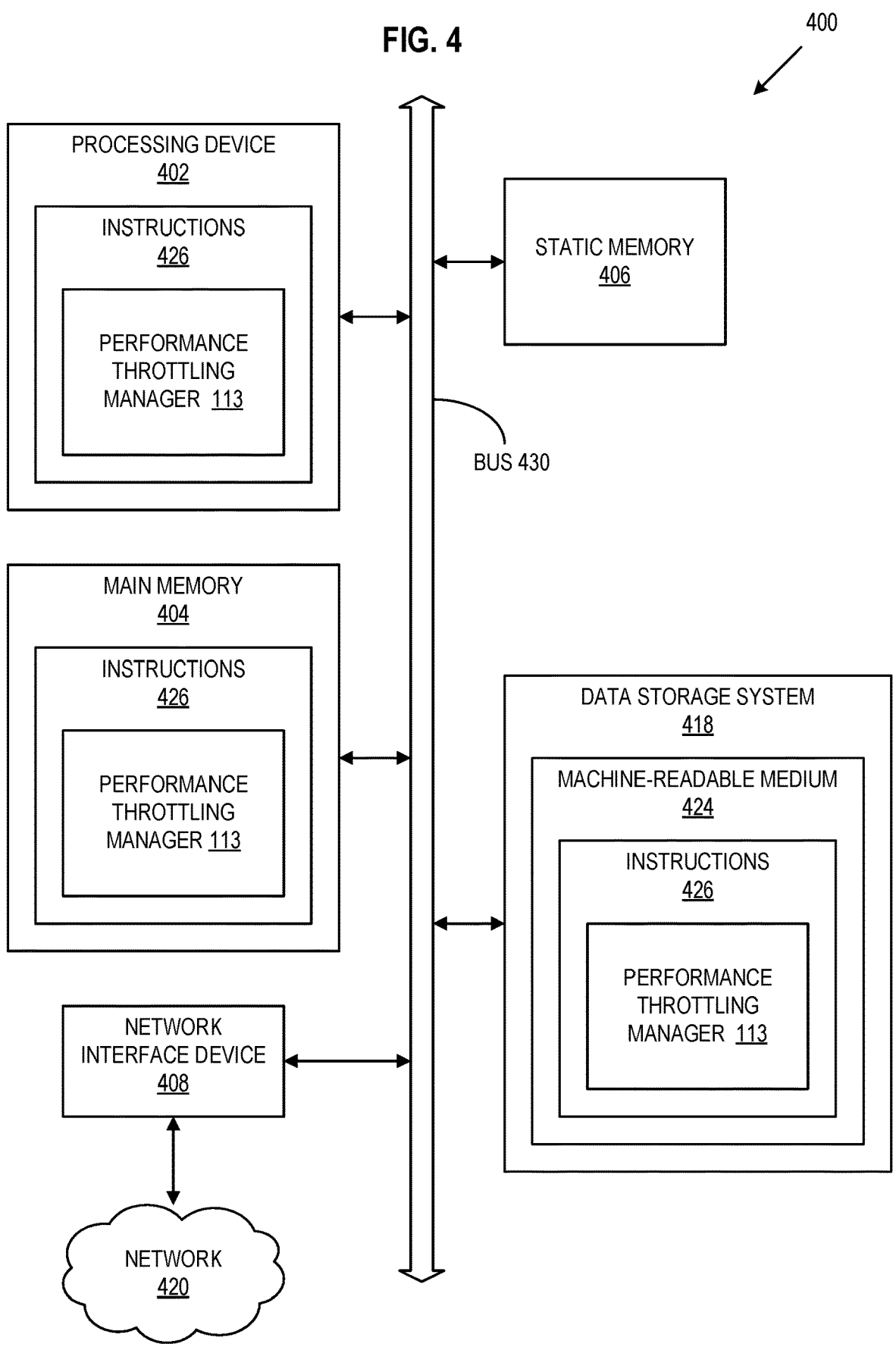
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to performance throttling manager 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a performance throttling manager (e.g., the performance throttling manager of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   monitoring an input voltage to a memory subsystem to determine a first input voltage value, the memory subsystem operating at a first performance level of a plurality of performance levels, wherein the input voltage is supplied by a host device and wherein the first performance level includes a first number of available parallel commands for the memory subsystem;
   detecting that the first input voltage value satisfies a threshold voltage value;
   in response to detecting that the first input voltage value satisfies a threshold voltage value, selecting a second performance level of the plurality of performance levels that throttles the performance of the memory device, wherein the second performance level includes a second number of available parallel commands for the memory subsystem and wherein the second number is less than the first number;
   monitoring the input voltage to the memory subsystem to determine a second input voltage value in response to determining a number of operations performed satisfies a threshold number of operations, the memory subsystem operating at the second performance level; and
   selecting between the second performance level and a third performance level of the plurality of performance levels using the second input voltage value, wherein the third performance level includes a third number of available parallel commands for the memory subsystem.

2. The method of claim 1, wherein selecting between the second performance level and the third performance level using the second input voltage value comprises:
   determining that the second input voltage value does not satisfy the threshold voltage value; and
   selecting the third performance level in response to determining that the second input voltage value does not satisfy the threshold voltage value.

3. The method of claim 2 further comprising:
   monitoring the input voltage to determine a third input voltage value to the memory subsystem, the memory subsystem operating at the third performance level;
   determining, while operating at the third performance level, that the third input voltage value satisfies the threshold voltage value; and
   returning the memory subsystem to the second performance level in response to determining that the third input voltage value satisfies the threshold voltage value.

4. The method of claim 2, wherein the third number of available parallel commands is larger than the second number and wherein the third number of available parallel commands is smaller than the first number.

5. The method of claim 1, wherein monitoring the input voltage to the memory subsystem to determine the second input voltage value is in response to determining a number of operations performed satisfies a threshold number of operations and wherein selecting between the second performance level and the third performance level using the second input voltage comprises:
    determining that the second input voltage value satisfies the threshold voltage value; and
    extending the operation of the memory subsystem at the second performance level in response to determining that the second input voltage value satisfies the threshold voltage value.

6. The method of claim 1, wherein:
monitoring the input voltage to the memory subsystem comprises:
    monitoring a common collector voltage ($V_{cc}$) of the memory subsystem; and
    monitoring a voltage of a power supply for input and/or output signals ($V_{ccq}$) of the memory subsystem;
detecting that the input voltage value satisfies a threshold voltage value comprises:
    determining that the common collector voltage of the memory subsystem satisfies a $V_{cc}$ threshold voltage value; and
    determining that the voltage of the power supply for input and/or output signals does not satisfy a $V_{ccq}$ threshold voltage value;
the first performance level is associated with a first controller frequency for a controller of the memory subsystem; and
the second performance level is associated with a second controller frequency for the controller of the memory subsystem, the method further comprising:
    selecting the second performance level lowering the first number of available parallel commands to the second number of available parallel commands in response to determining that the common collector voltage of the memory subsystem satisfies the $V_{cc}$ threshold voltage value; and
    selecting the second performance level with the second controller frequency as the same as the first controller frequency in response to determining that the voltage of the power supply for input and/or output signals does not satisfy the $V_{ccq}$ threshold voltage value.

7. The method of claim 6, wherein monitoring the input voltage to the memory subsystem further comprises monitoring the common collector voltage in parallel with monitoring the voltage of the power supply for input and/or output signals.

8. The method of claim 1, wherein:
monitoring the input voltage to the memory subsystem comprises:
    monitoring a common collector voltage ($V_{cc}$) of the memory subsystem; and
    monitoring a voltage of a power supply for input and/or output signals ($V_{ccq}$) of the memory subsystem;
detecting that the input voltage value satisfies a threshold voltage value comprises:
    determining that the common collector voltage of the memory subsystem satisfies a $V_{cc}$ threshold voltage value; and
    determining that the voltage of the power supply for input and/or output signals satisfies a $V_{ccq}$ threshold voltage value;
the first performance level is associated with a first controller frequency for a controller of the memory subsystem; and
the second performance level is associated with a second controller frequency for the controller of the memory subsystem, the method further comprising:
    selecting the second performance level lowering the first number of available parallel commands to the second number of available parallel commands in response to determining that the common collector voltage of the memory subsystem satisfies a $V_{cc}$ threshold voltage value; and
    selecting the second performance level with the second controller frequency less than the first controller frequency in response to determining that the voltage of the power supply for input and/or output signals satisfies the $V_{ccq}$ threshold voltage value.

9. The method of claim 8, wherein monitoring the input voltage to the memory subsystem further comprises monitoring the common collector voltage in parallel with monitoring the voltage of the power supply for input and/or output signals.

10. A non-transitory computer-readable storage medium comprising instructions that, when executed by a processing device, cause the processing device to:
    monitor an input voltage to a memory subsystem to determine a first input voltage value, the memory subsystem operating at a first performance level of a plurality of performance levels, wherein the input voltage is supplied by a host device and wherein the first performance level includes a first number of available parallel commands for the memory subsystem;
    detect that the first input voltage value satisfies a threshold voltage value;
    in response to detecting that the first input voltage value satisfies a threshold voltage value, select a second performance level of the plurality of performance levels that throttles the performance of the memory device, wherein the second performance level includes a second number of available parallel commands for the memory subsystem and wherein the second number is less than the first number;
    monitor the input voltage to the memory subsystem to determine a second input voltage value in response to determining a number of operations performed satisfies a threshold number of operations, the memory subsystem operating at the second performance level; and
    select between the second performance level and a third performance level of the plurality of performance levels using the second input voltage value, wherein the third performance level includes a third number of available parallel commands for the memory subsystem.

11. The non-transitory computer-readable storage medium of claim 10, wherein to select between the second performance level and the third performance level using the second input voltage value, the processing device is further caused to:
    determine that the second input voltage value does not satisfy the threshold voltage value; and
    select the third performance level in response to determining that the second input voltage value does not satisfy the threshold voltage value.

12. The non-transitory computer-readable storage medium of claim 11, wherein the processing device is further caused to:
    monitor the input voltage to determine a third input voltage value to the memory subsystem, the memory subsystem operating at the third performance level;

determine, while operating at the third performance level, that the third input voltage value satisfies the threshold voltage value; and return the memory subsystem to the second performance level in response to determining that the third input voltage value satisfies the threshold voltage value.

13. The non-transitory computer-readable storage medium of claim 10, wherein the third number of available parallel commands is larger than the second number and wherein the third number of available parallel commands is smaller than the first number.

14. The non-transitory computer-readable storage medium of claim 10, wherein monitoring the input voltage to the memory subsystem to determine the second input voltage value is in response to determining a number of operations performed satisfies a threshold number of operations and wherein to select between the second performance level and the third performance level using the second voltage input causes the processing device further to:

determine that the second input voltage value satisfies the threshold voltage value; and extend the operation of the memory subsystem at the second performance level in response to determining that the second input voltage value satisfies the threshold voltage value.

15. A system comprising:

a plurality of memory devices; and a processing device, operatively coupled with the plurality of memory devices, to:

monitor an input voltage to a memory subsystem to determine a current input voltage value, the memory subsystem operating at a first performance level of a plurality of performance levels, wherein the input voltage is supplied by a host device and wherein the first performance level includes a first number of available parallel commands for the memory subsystem;

detect that the first input voltage value satisfies a threshold voltage value;

in response to detecting that the first input voltage value satisfies a threshold voltage value, select a second performance level of the plurality of performance levels that throttles the performance of the memory device, wherein the second performance level includes a second number of available parallel commands for the memory subsystem and wherein the second number is less than the first number;

monitor the voltage input to the memory subsystem to determine a second input voltage value in response to determining a number of operations performed satisfies a threshold number of operations, the memory subsystem operating at the second performance level; and select between the second performance level and a third performance level of the plurality of performance levels using the second input voltage value, wherein the third performance level includes a third number of available parallel commands for the memory subsystem.

16. The system of claim 15, wherein to select between the second performance level and the third performance level using the second input voltage value, the processing device is further caused to:

determine that the second input voltage value does not satisfy the threshold voltage value; and select the third performance level in response to determining that the second input voltage value does not satisfy the threshold voltage value.

17. The system of claim 15, wherein the processing device is further caused to:

monitor the input voltage to determine a third input voltage value to the memory subsystem, the memory subsystem operating at the third performance level;

determine, while operating at the third performance level, that the third input voltage value satisfies the threshold voltage value; and return the memory subsystem to the second performance level in response to determining that the third input voltage value satisfies the threshold voltage value.

18. The system of claim 15, wherein monitoring the input voltage to the memory subsystem to determine the second input voltage value is in response to determining a number of operations performed satisfies a threshold number of operations and wherein to select between the second performance level and the third performance level using the second input voltage causes the processing device further to:

determine that the second input voltage value satisfies the threshold voltage value; and extend the operation of the memory subsystem at the second performance level in response to determining that the second input voltage value satisfies the threshold voltage value.

* * * * *